United States Patent [19]

Kayama et al.

[11] 4,096,328
[45] Jun. 20, 1978

[54] DIVALENT SILVER OXIDE CELL

[75] Inventors: Akira Kayama; Toyoo Harada, both of Tokyo, Japan

[73] Assignee: Kabushiki Kaisha Daini Seikosha, Japan

[21] Appl. No.: 802,470

[22] Filed: Jun. 1, 1977

[30] Foreign Application Priority Data

Jun. 1, 1976 Japan .................................. 51-63694

[51] Int. Cl.$^2$ ............................................. H01M 4/34
[52] U.S. Cl. .................... 429/144; 429/219; 29/623.5
[58] Field of Search ................ 429/219, 144; 29/623.5

[56] References Cited

U.S. PATENT DOCUMENTS 3,920,478  11/1975  Kozawa .............................. 429/219
4,009,056  2/1977  Megahed et al. .................... 429/219

Primary Examiner—Donald L. Walton
Attorney, Agent, or Firm—Robert E. Burns; Emmanuel J. Lobato; Bruce L. Adams

[57] ABSTRACT

In order to avoid a distinct two step plateau in the discharge voltage of a divalent silver oxide cell, the positive depolarizing mixture pellet in the positive cap serving as the cathode terminal of the cell is covered with a silver or mono-silver oxide layer. The layer is, for example, formed of foamed silver which is partially compressed during assembly of the cell. Monovalent silver oxide powder may be applied to and penetrate in the foamed silver. Alternatively, the surface of the foamed silver may be oxidized to form a mono-silver oxide layer thereon.

9 Claims, 2 Drawing Figures

DIVALENT SILVER OXIDE CELL

FIELD OF INVENTION

This invention relates to divalent silver oxide cells and particularly to avoiding a two step plateau in the discharge voltage of such cells.

BACKGROUND OF THE INVENTION

The divalent silver oxide cell is of particular interest as a power source for small electronic apparatus such as electronic wristwatches and the like because of having a high energy density per unit volume. However, an undesirable characteristics of such cells is that the discharge voltage of the cell shows a distinct two step plateau. That is the potential difference of discharge to turn divalent silver oxide into monovalent silver oxide is approximately 0.3V. Where high accuracy is required, such as in electronic wristwatches, it is desirable to eliminate such discharge voltage plateau.

A method of eliminating such high potential discharge voltage plateau in divalent silver oxide cells has been disclosed in Japan Patent No. 48-32850. In accordance with this patent, the entire circumference of the positive depolarizing mix pellet made of divalent silver oxide is enveloped with a continuous layer of monovalent metal oxide such as monovalent silver oxide or silver itself. However, this method has the disadvantage of decreasing the quantity of divalent silver oxide in the cell and complicating the production processes of the cell.

SUMMARY OF THE INVENTION

It is an object of the present invention to provide an improved divalent silver oxide cell which overcomes the defects referred to above. In accordance with the invention, the upper surface of a disc shaped pellet composed mainly of divalent silver oxide and constituting the positive depolarizing mixture of the cell is coated with foamed silver having a porous structure. The layer of foamed silver may have monovalent silver oxide powder or a mixture of monovalent silver oxide powder and powdered silver penetrating therein. Alternatively, the surface of the foamed silver covering may be oxidized to form a monovalent silver oxide layer on the surface. The construction in accordance with the invention has been found to avoid the two step plateau in the discharge voltage that has heretofore characterized divalent silver oxide cells.

BRIEF DESCRIPTION OF DRAWINGS:

The nature, objects and advantages of the invention will be more fully understood from the following description in accordance with the present invention in which.

Figure 1:
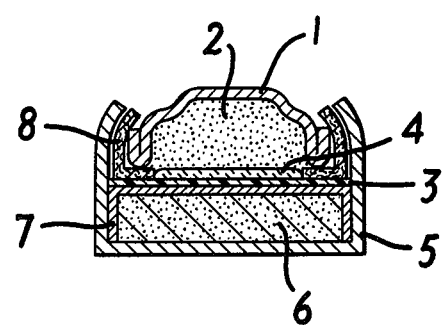
FIG. 1 is a longitudinal section of a miniature divalent silver oxide cell made in accordance with the present invention.

DESCRIPTION OF PREFERRED EMBODIMENT:

As shown by way of example in FIG. 1, a divalent silver oxide cell, in accordance with the present invention, comprises a negative cap 1 which serves as the anode terminal of the cell and houses a negative depolarizing mix 2 made of amalgamated zinc. A positive cup 5 which serves as the cathode terminal of the cell houses a positive depolarizing mixture pellet 6 of divalent silver oxide, the upper surface and sides of which are covered with a foamed silver or monovalent silver oxide layer 7 which is applied to the pellet 6 before the pellet is placed in the cup 5. The negative cap 1 is assembled with the positive cup 5 with a separator 3 and a layer 4 of electrolyte absorbent material between the pellet 6 and the negative depolarizing mix 2. A gasket 8 of packing material provides insulation and sealing between the negative cap 1 and the positive cup 5, the upper portion of which is crimped in to secure the cap and cup together.

In accordance with the invention the layer 7 which covers the upper surface of the divalent silver oxide pellet 6 is formed of foamed silver in a sponge-like condition. The foamed silver layer may have monovalent silver oxide powder or a mixture of silver powder and monovalent silver oxide powder penetrating in it. Alternatively, the surface of the foamed silver coating may be oxidized electrolytically to form a monovalent silver oxide layer on the surface. The initial porosity of the foamed silver is preferably between 85% and 98%. During assembly of the cell, the porosity is decreased by compression but should remain greater than 5% and preferably not less than 10%. The construction of the cell will be further understood from the examples described below.

EXAMPLE 1

Figure 2:
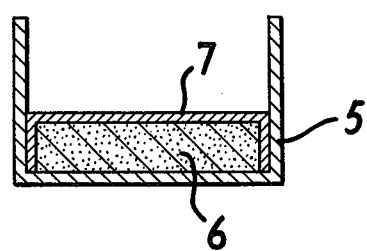
FIG. 2 is a longitudinal section illustrating a method of construction of the cell of FIG. 1.

The positive depolarizing mixture composed mainly of divalent silver oxide is formed into a disc shaped pellet which is placed in the positive cap 5 with a layer of foamed silver covering the upper surface and sides of the pellet (excepting only the bottom surface thereof) as shown in FIG. 2. The term "foamed silver" is herein used as a generic name for silver having a porous structure which has a much greater porosity than normally porous sintered metal, the porosity being 85% to 98% so that the metal is in a sponge-like condition. Accordingly the apparent density of the foamed silver is approximately 1/7 - 1/50 compared with solid silver plate. The porosity can be decreased at will by compressing and deforming the foamed silver in the assembly of the cell. The flexibility of the foamed silver cover is greatly superior due to its original matrix structure.

After the divalent silver oxide pellet 6 with the foamed silver cover 7 is put in the positive cup 5, the separator 3, the electrolyte absorbent material 4 and the packing material 8 are inserted and the negative cap 1 containing the negative depolarizing mixture 2 is assembled with the positive cup and finally the cell shown in FIG. 1 is fabricated by an assembling operation in which the upper end portion of the positive cup is contracted so as to secure the positive cup and negative cap together.

EXAMPLE 2

The cell is fabricated in the same manner as in Example 1 except that monovalent silver oxide powder is penetrated into the foamed silver cover on the upper surface of the divalent silver oxide pellet before the press-forming operation.

EXAMPLE 3

The cell is fabricated in the same manner as in Example 1 except that the surface of the foamed silver cover of the divalent silver oxide pellet is oxidized electrolytically to form a monovalent silver oxide layer thereon.

TEST OF EXAMPLES

The open circuit voltage and internal resistance of the cell fabricated by Example 1 are dependent on the pressure applied in the press-forming operation of the positive depolarizing mix and foamed silver. The resultant values are shown in Table 1.

Table 1

| Forming Pressure of Cathode | Open Circuit Voltage | Internal Resistance |
|---|---|---|
| 0.5t/cm$^2$ | 1.75V | 45Ω |
| 2.1 " | 1.65V | 123Ω |
| 4.0 " | 1.61V | 125Ω |
| 8.0 " | 1.61V | 135Ω |

The cells which were fabricated and used in the tests were miniature cells having a diameter of 7.9mm and an overall height of 3.6mm. The number of cells fabricated for each example was 50 and the data herein given shows means values of the pieces tested.

As will be seen from Table 1, the values are dependent on the press-forming pressure of the anode and the open circuit voltages are lower than the high voltage plateau of about 1.85V.

In the same manner, the open circuit voltages and internal resistances of the cells manufactured in accordance with Example 2 are shown in the following Table 2.

Table 2

| Forming Pressure of Cathode | Open Circuit Voltage | Internal Resistance |
|---|---|---|
| 0.5t/cm$^2$ | 1.63V | 28Ω |
| 2.0 " | 1.61V | 21Ω |
| 4.0 " | 1.61V | 15Ω |
| 8.0 " | 1.61v | 12Ω |

The above values in Table 2 show better results than in Table 1 both in respect to circuit voltages and internal resistances.

The filling-up density of the positive depolarizing mixture is dependent on the pressure applied in the press-forming operation thereof. It will thus be understood from the results of Examples 1 and 2 that a pressure of about 8t/cm$^2$ is the most desirous value.

The foamed silver layer is required to have a certain necessary minimum porosity but in the case of Example 1 the internal resistance values have a tendency to rise because of decreasing porosity of the silver layer below 10%. Therefore, in order to suppress the effects of the decrease of porosity, it is preferable to penetrate the foamed silver with monovalent silver oxide powder or a mixture of silver powder and monovalent silver oxide powder according to the fabricating method of Example 2.

The open circuit voltages and internal resistances of the cell fabricated by the method described in Example 3 are shown in Table 3.

Table 3

| Forming Pressure of Cathode | Open Circuit Voltage | Internal Resistance |
|---|---|---|
| 4.0t/cm$^2$ | 1.61V | 25Ω |
| 8.0t/cm$^2$ | 1.61V | 38Ω |

In the above values the open circuit voltages decrease to approximately the 1.6V level and also the internal resistances show somewhat better results. Compared with the fabricating method of Example 2, that of Example 3 is effective as a forming method of the silver layer because of being able to eliminate the process of penetrating monovalent silver oxide in the silver layer. However, it is necessary to select a suitable oxidizing treatment to make the conductivity of the silver layer uniform because of forming a nonconductive monovalent silver oxide layer over all the surface of the foamed silver.

As will be seen from the embodiments described above, the characteristics of a divalent silver oxide cell are improved by using a layer of foamed silver on the surface of the positive depolarizing mixture composed mostly of divalent silver oxide. By reason of the improvements which it provides the invention has an important industrial value.

What we claim is:

1. In a divalent silver oxide cell comprising a positive metal cup, a disc shaped pellet of a positive depolarizing mixture composed mainly of divalent silver oxide in said cup, a negative metal cap sealed to and electrically insulated from positive metal cup, a negative depolarizing mixture in said negative metal cap and a separator and a layer of electrolyte-containing absorbent material between said pellet of positive depolarizing mixture and said negative depolarizing mixture, the improvement that comprises a layer of foamed silver overlying the upper face of said pellet of positive depolarizing mixture and thereby disposed between said pellet and said layer of absorbent material, said foamed silver having a porosity greater than 5%.

2. A divalent silver oxide cell according to claim 1, in which monovalent silver oxide powder is penetrated in said foamed silver layer.

3. Divalent silver oxide cell according to claim 1, in which a mixture of powdered silver and monovalent silver oxide powder is penetrated in said layer of foamed silver.

4. Divalent silver oxide cell according to claim 1, in which the surface of said foamed silver layer is electrolytically oxidized to form a uniform coating of monovalent silver oxide thereon.

5. A method of making a divalent silver oxide cell which comprises providing a positive metal cup, placing in said cup a disc shaped pellet of a positive depolarizing mixture composed mainly of divalent silver oxide with a layer of foamed silver overlying the upper face of said pellet and around the periphery of said pellet, providing a negative metal cap, placing in said cap a negative depolarizing mixture, assembling said cup and said cap with a separator and a layer of electrolyte-containing absorbent material between said pellet of positive depolarizing mixture and said negative depolarizing mixture and with an insulating sealing ring between said cup and said cap, and securing said cup and said cap together.

6. A method of making a divalent silver oxide cell according to claim 5, in which the initial porosity of said foamed silver is between 85% and 98%, said foamed silver being subjected to compressing in the assembled cell.

7. A method of making a divalent silver oxide cell according to claim 5, in which monovalent silver oxide powder is penetrated into said foamed silver layer.

8. A method of making a divalent silver oxide cell according to claim 5, in which a mixture of powered silver and monovalent silver oxide powder is penetrated into said foamed silver layer.

9. A method of making a divalent silver oxide cell according to claim 5, further comprising the step of electrolytically oxidizing the surface of said foamed silver layer.

* * * * *